United States Patent
Parkinson

(10) Patent No.: US 8,644,011 B2
(45) Date of Patent: Feb. 4, 2014

(54) ELECTRONIC DEVICE COVER AND METHOD OF MAKING SAME

(76) Inventor: Kevin Parkinson, New Westminster (CA)

( * ) Notice: Subject to any disclaimer, the term of this patent is extended or adjusted under 35 U.S.C. 154(b) by 1035 days.

(21) Appl. No.: 12/701,520

(22) Filed: Feb. 5, 2010

(65) Prior Publication Data

US 2010/0200456 A1  Aug. 12, 2010

Related U.S. Application Data

(60) Provisional application No. 61/150,711, filed on Feb. 6, 2009.

(51) Int. Cl.
 *G06F 1/16* (2006.01)
 *A45F 5/00* (2006.01)
 *H04M 1/00* (2006.01)

(52) U.S. Cl.
 USPC ............. 361/679.09; 224/191; 455/575.1

(58) Field of Classification Search
 USPC ............ 455/575.1, 566; 361/679.03, 679.09, 361/679.41, 679.56; 224/560; 312/223.1
 See application file for complete search history.

(56) References Cited

U.S. PATENT DOCUMENTS

| | | | |
|---|---|---|---|
| 5,346,395 A | 9/1994 | Adell | |
| 5,713,466 A | 2/1998 | Tajima | |
| 5,896,453 A | 4/1999 | Speaks | |
| 6,646,864 B2 | 11/2003 | Richardson | |
| 6,785,566 B1 | 8/2004 | Irizarry | |
| 6,950,516 B2 | 9/2005 | Pirila et al. | |
| 6,980,777 B2 | 12/2005 | Shepherd et al. | |
| 6,995,976 B2 | 2/2006 | Richardson | |
| 7,180,735 B2 | 2/2007 | Thomas et al. | |
| 7,230,823 B2 | 6/2007 | Richardson et al. | |
| 7,312,984 B2 | 12/2007 | Richardson et al. | |
| 7,354,654 B2 | 4/2008 | Masuda et al. | |
| 7,778,023 B1 * | 8/2010 | Mohoney | 361/679.41 |
| 2005/0217746 A1 | 10/2005 | Hayashi et al. | |
| 2006/0159862 A1 | 7/2006 | Lifka et al. | |
| 2006/0279924 A1 * | 12/2006 | Richardson et al. | 361/683 |
| 2007/0080446 A1 | 4/2007 | Maloney | |
| 2007/0158220 A1 * | 7/2007 | Cleereman et al. | 206/320 |

(Continued)

FOREIGN PATENT DOCUMENTS

| | | | |
|---|---|---|---|
| JP | 2007159716 A | 6/2007 | |
| WO | 0203828 A1 | 1/2002 | |
| WO | 2004028007 A1 | 4/2004 | |
| WO | 2005072182 A2 | 8/2005 | |

*Primary Examiner* — Mohammad Islam
(74) *Attorney, Agent, or Firm* — C. Larry Kyle; Nexus Law Group LLP

(57) ABSTRACT

A water-resistant cover consisting of three components: a soft, form-fitting shell, a plastic slider and a plastic end cap. The shell does not inhibit the functionality of peripheral controls and includes fully integrated polycarbonate windows that are thermally and mechanically bonded to the shell in the molding process, the windows being adapted to the specific contour and profile of the device and to protect the device's screen while not inhibiting the functionality of a touchscreen, keypad or acoustic devices. The slider is slidably connected to the cover for closing the audio jack aperture in the shell with a double closure to maintain a water-resistant seal when not in use. The end cap closes the cover with reciprocal seals that are molded into both components and the cap is easily removed for access to a data port or charger and is enhanced with water-resistant acoustic vents that provide sound clarity to speakers or microphones.

20 Claims, 11 Drawing Sheets

(56) References Cited

U.S. PATENT DOCUMENTS

| | | |
|---|---|---|
| 2007/0212561 A1 | 9/2007 | Wada et al. |
| 2007/0215663 A1* | 9/2007 | Chongson et al. ............ 224/930 |
| 2008/0041896 A1 | 2/2008 | Holmberg |
| 2008/0083631 A1 | 4/2008 | Tsang et al. |
| 2012/0172090 A1* | 7/2012 | Capps ........................... 455/566 |
| 2013/0032617 A1* | 2/2013 | Adelman et al. ............... 224/191 |
| 2013/0099637 A1* | 4/2013 | Richardson et al. ........ 312/223.1 |

\* cited by examiner

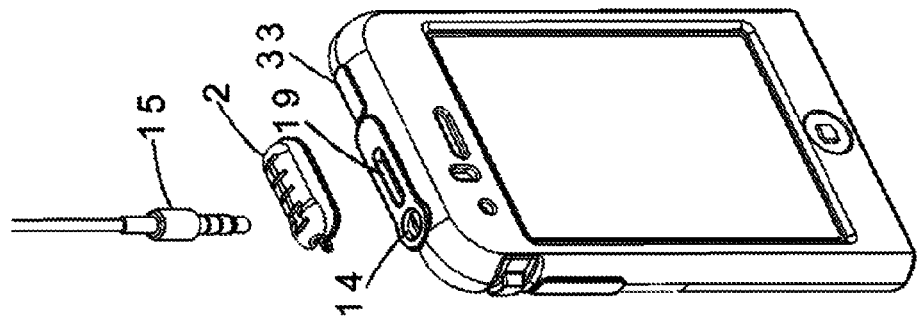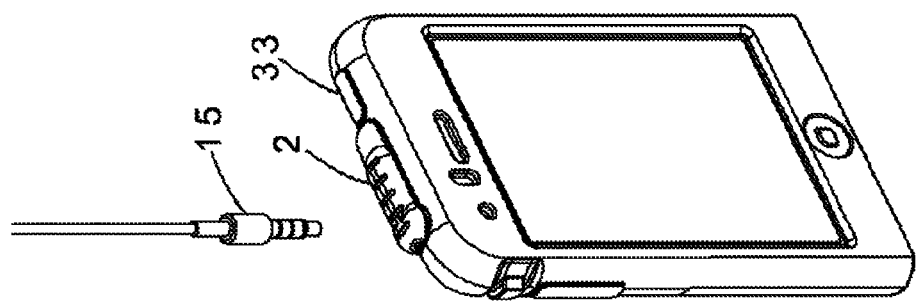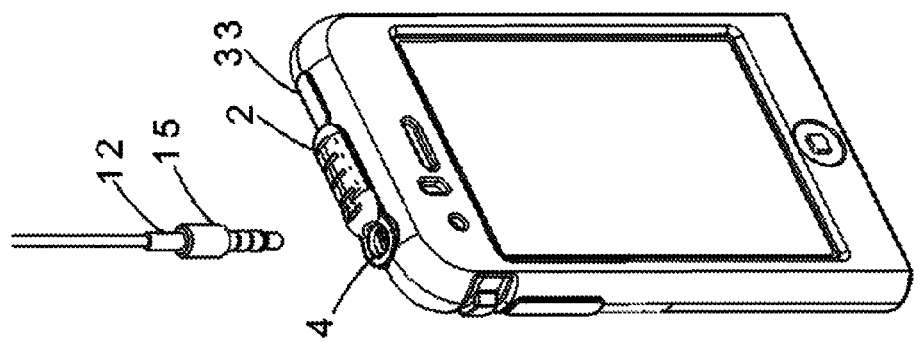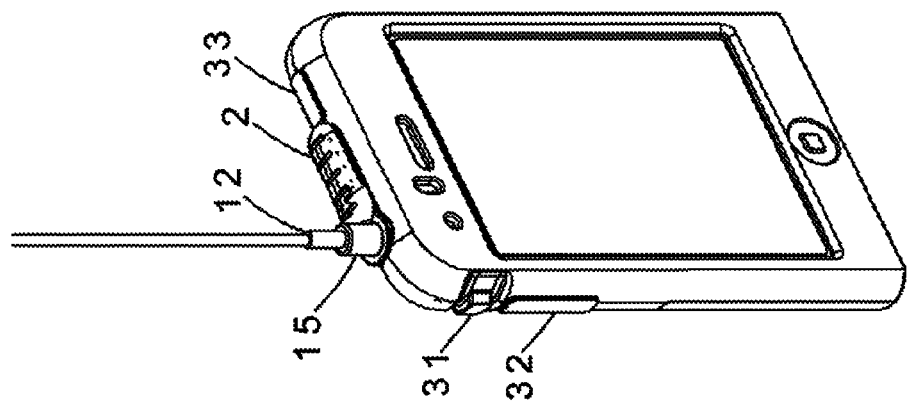

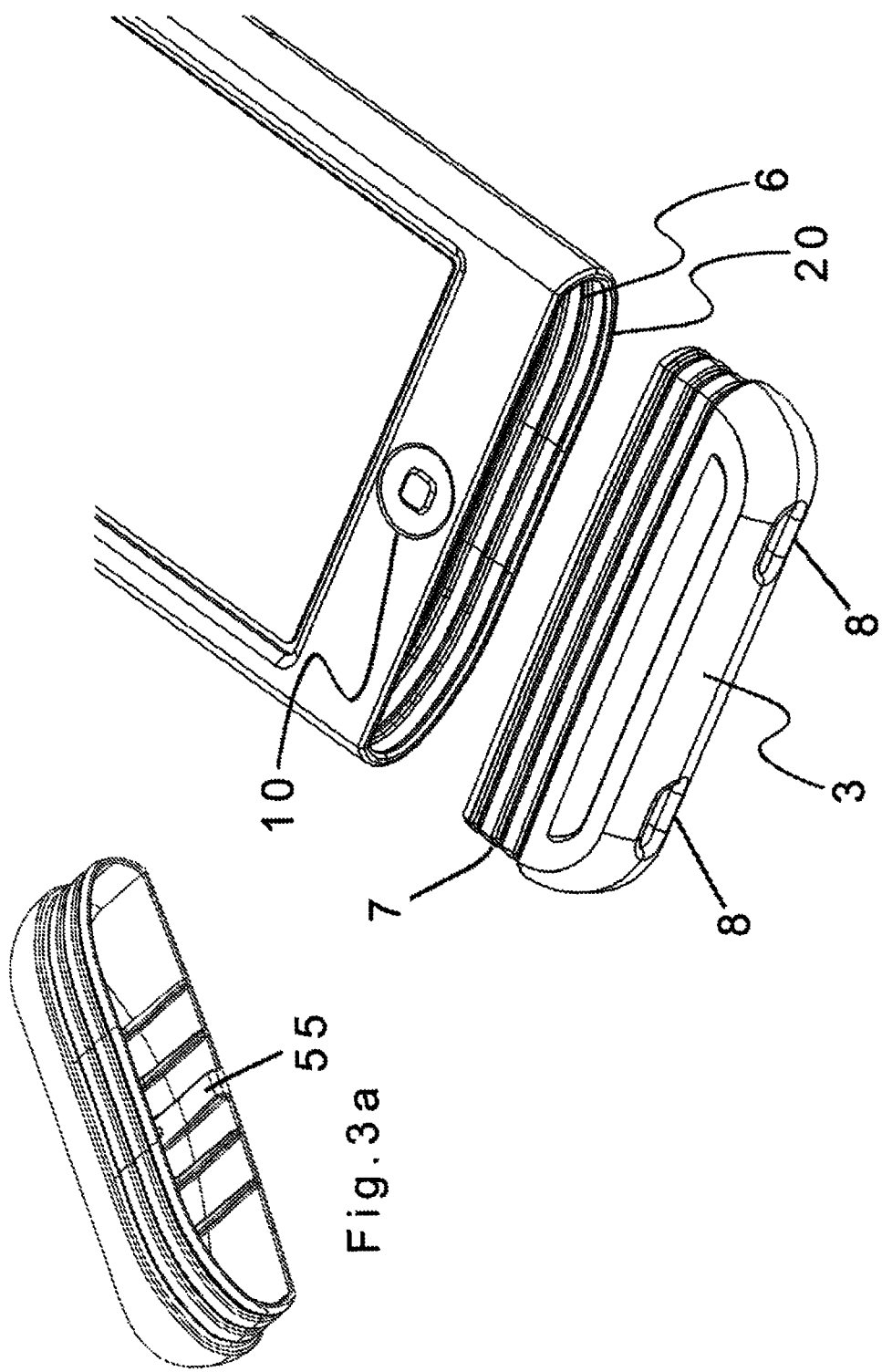

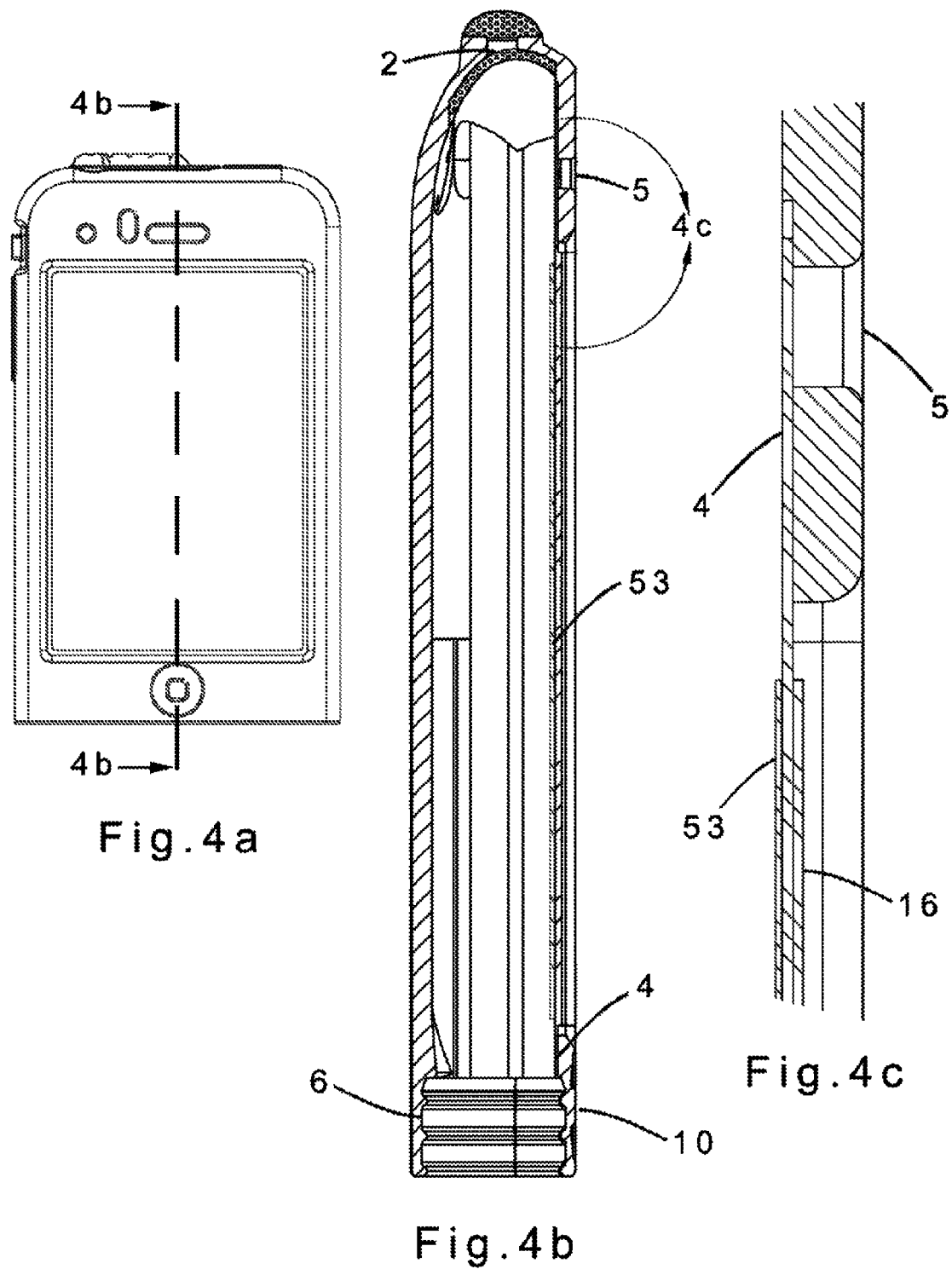

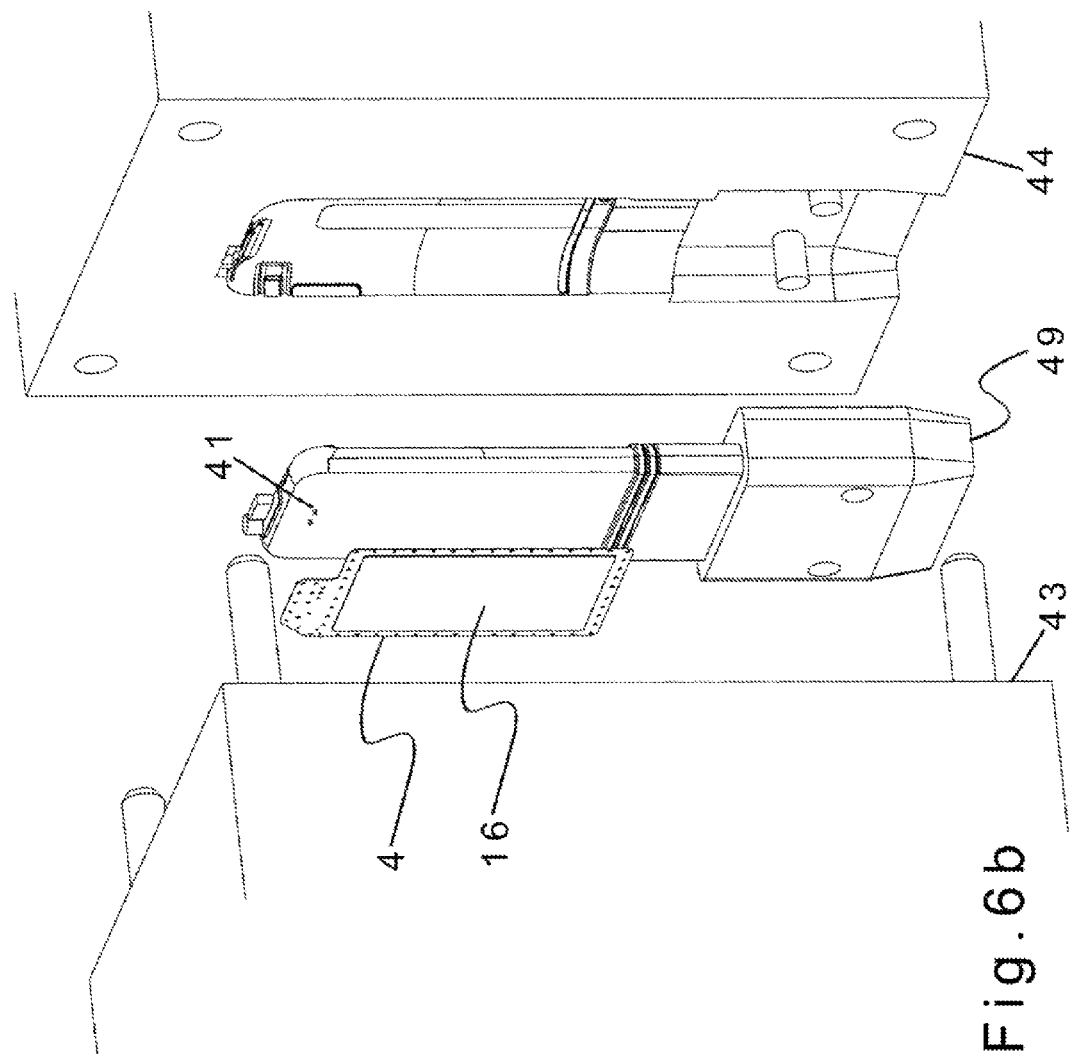

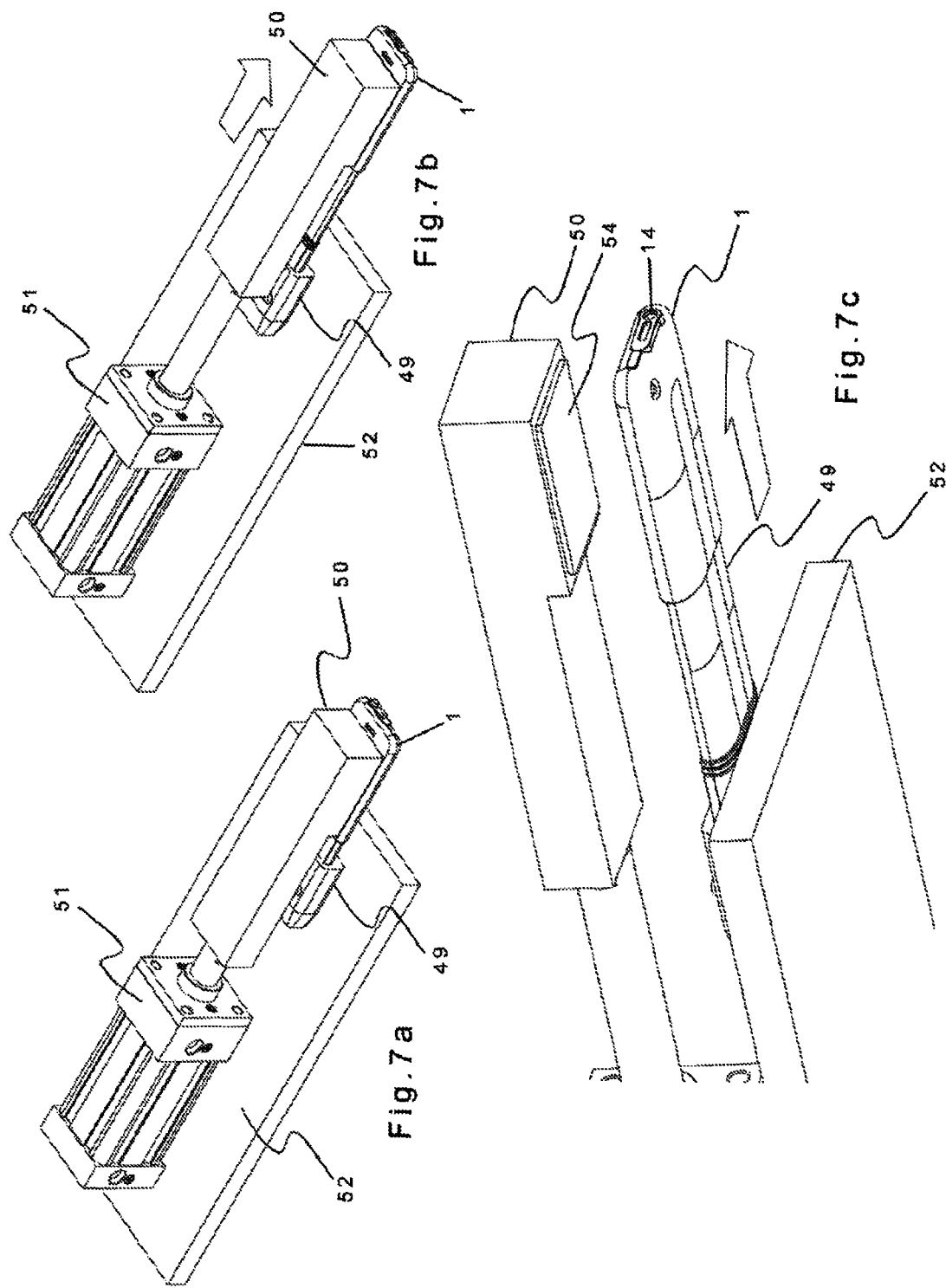

ELECTRONIC DEVICE COVER AND METHOD OF MAKING SAME

FIELD OF THE INVENTION

The present invention relates generally to covers for electronic devices and the process for the manufacture of the covers, and more specifically, to a process for the manufacture of covers in which a polycarbonate window is thermally bonded to a soft outer shell during the molding process, so as to obviate any possible delaminating of the window from the shell of the cover.

BACKGROUND OF THE INVENTION

With continued advances in technology, today's consumers find themselves with an ever increasing number of personal digital devices to choose from. These include cellular phones, "smart" phones, personal digital assistants (PDAs), portable GPS units, compact game systems, compact audio/video players and wireless reading devices.

While these electronic devices continue to improve, with an ever increasing list of features, they still suffer from a long-standing problem: their vulnerability to the elements, in particular dust and water. They are also susceptible to damage from general wear and tear, most noticeably the scratching or otherwise negatively impacting of the video screens. Protective covers have therefore been developed in order to protect these devices.

Most of the cases currently on the market are almost indistinguishable from a myriad of generic cases. They almost always offer face, side, and back protection for the encased electronic device, often including protection on the user interface (such as a click wheel or key pad), but leave the screen, switches, headphone ports, and charger ports or dock connector ports entirely exposed. Some models may include a screen protector that is applied as a separate component to the casing. As these screen protectors are not an incorporated component of the product, they will not protect against exposure to dust or moisture and are designed solely to protect the screen from scratching.

U.S. Pat. No. 5,896,453 teaches a flexible, plastic, waterproof enclosure wrapped around the circuitry of an electronic device (in this case a cellular phone) inside the phone housing. While providing waterproofing for the device, it provides no protection to the screen.

U.S. Pat. No. 6,785,566 teaches an electronic device case comprised of a foam casing covered in vinyl having a transparent viewing window and hinged openings for the speaker and microphone. The case is designed to absorb impact and be waterproof and stain resistant. While suitable for the last generation of cellular phones having raised buttons, the foam case is large and cumbersome, running counter to the trend of small and streamlined electronic devices and not adapted for use with the touch screen devices available today. In addition, while a transparent window is provided with the case, the windows are not integrated or bonded to the case, and are therefore neither water nor dust resistant.

U.S. Pat. No. 7,312,984 teaches a number of protective case designs, all of which are rigid, hard-shell cases. A number of the protective cases are watertight, crush-resistant and impact-resistant. These cases have an outer shell in the form of an upper and a lower shell that are hingedly connected. A protective membrane is connected to the shell to allow a user to view, and use in the case of a touch screen, the device screen when the device is placed in the protective case. Adapters (for example, a head phone jack) may be disposed within the case for connecting to the device so that the user need only connect to the case, such that the protection afforded by the case is not affected.

While these devices provide significant protection for the electronic devices they are designed to carry, they are large and cumbersome, turning an elegant, svelte electronic device into a larger, plastic-covered device, and are relatively costly. In addition, the protective membrane is connected to the shell by way of an o-ring, which could lead to problems with water ingress should the o-ring become dislodged or otherwise improperly connected. An alternative embodiment teaches connecting the protective membrane to a protective foam which in turn is connected to the outer shell. Such a connection, presumably using an adhesive, could lead to delamination of the protective membrane from the protective foam and problems with water ingress.

None of the prior art cases offer a soft-shell, compact case with comprehensive protection with a fully enclosed screen that is video compatible at a price that is affordable for the average consumer. It is therefore an object of an embodiment of the present invention to provide a soft-shell electronic device cover that provides protection from dust and water but that is less costly and cumbersome than those taught in the prior art and a method for making same.

Other objects of embodiments of the invention will be apparent from the description that follows.

SUMMARY OF THE INVENTION

The present invention has solved the problems cited above utilizing a process whereby a thin polycarbonate window is thermally bonded to the soft outer shell of the cover during the injection molding process to create a water-resistant seal. An integrated window covers the lens portal on devices with cameras. The shell features a water-resistant acoustic vent over the earphone speaker aperture. To complete the water-resistant enclosure, a plastic slider with a dual seal was designed to close the audio jack aperture on both the inner and outer surfaces of the cover's shell and a plastic end cap featuring water-resistant acoustic vents closes the bottom of the cover with reciprocal seals that are molded into both the shell and end cap components.

According to one aspect of the present invention, there is provided a protective cover for an electronic device having a viewing screen. The cover comprises a shell and an end cap. The shell defines an enclosure with an opening at one end and has a shape corresponding to the shape of the electronic device for receiving the electronic device within the enclosure. The shell being formed of a soft, elastomeric material and having a protective membrane integrally connected to the soft shell, providing a viewing window through which the viewing screen may be viewed, and operated in the case of a touch screen device, when the electronic device is inserted into the shell. The rigid end cap is removably connectable to the open end of the soft sleeve to fully encase the electronic device when inserted into the shell.

The protective membrane has a plurality of perforations and is thermally and mechanically bonded to the shell. Preferably the shell is made of a thermoplastic elastomer or a thermoplastic rubber. The elastomer or rubber fills the plurality of perforations to form the mechanical bond. Preferably the protective membrane is a polycarbonate thermoplastic.

The protective cover may further comprise an aperture in the shell corresponding to an input area of the electronic device and an elongated guide slot in the shell adjacent to the aperture, the aperture being sealable by way of a rigid slider slidable within the guide slot from an open position wherein the aperture is open, to a closed position wherein the aperture is sealed. The slider closes the aperture with a double internal and external seal to maintain a water-resistant seal about the aperture when in the closed position.

The slider has an internal sealing element and an external sealing element joined by a central column. The slider further comprises a protrusion extending from the external sealing element, the protrusion inserting into the aperture when the slider is in the closed position.

According to another aspect of the present invention there is provided a method of manufacturing a protective cover for an electronic device having a viewing screen comprising the step of thermally and mechanically bonding a protective membrane to a soft outer shell.

The method further comprises the steps of: preparing a mold having a first portion and a second portion, the mold having a shape corresponding substantially to, and slightly larger than, the shape of said electronic device; positioning the protective membrane into the first portion, the protective membrane having a plurality of perforations about its outer edge; positioning a mandrel into the first portion adjacent the protective membrane, the mandrel shaped to correspond to the shape of the electronic device; connecting the second portion to the first portion thereby enclosing the protective membrane and mandrel within the mold; and injecting an elastomeric material into the mold, the elastomeric material surrounding the mandrel and thermally and mechanically bonding to the protective membrane.

Other aspects of the invention will be appreciated by reference to the detailed description of the preferred embodiment and to the claims that follow.

BRIEF DESCRIPTION OF THE DRAWINGS

These and other features of the invention will become more apparent from the following description in which reference is made to the appended drawings and wherein:

FIGS. 2*a* to 2*d* are perspective views of the cover shown in FIG. 1 that illustrates the practical application of the plastic slider in the top of the cover which seals off the audio jack aperture;

FIG. 3*a* is a perspective view of the end cap for use with the cover;

FIG. 3*b* is a perspective view of the cover shown in FIG. 1 that illustrates the plastic end cap that closes the cover with reciprocal seals that are molded into both the shell and the end cap of the cover;

FIG. 4*a* is a front plan view of the cover with the plastic slider shown in the closed position as shown in FIG. 2*c*;

FIG. 4*b* is a sectional view of the cover taken along the line 4*b*-4*b* shown in FIG. 4*a* that illustrates the scope and the placement of the polycarbonate window;

FIG. 4*c* is a sectional view of Detail D shown in FIG. 4*b*;

FIGS. 6*a* and 6*b* are perspective views of the manufacturing molds;

FIGS. 7*a*, 7*b*, and 7*c* are perspective views of a stripper die mechanism;

DETAILED DESCRIPTION OF THE PREFERRED EMBODIMENT

Figure 1:
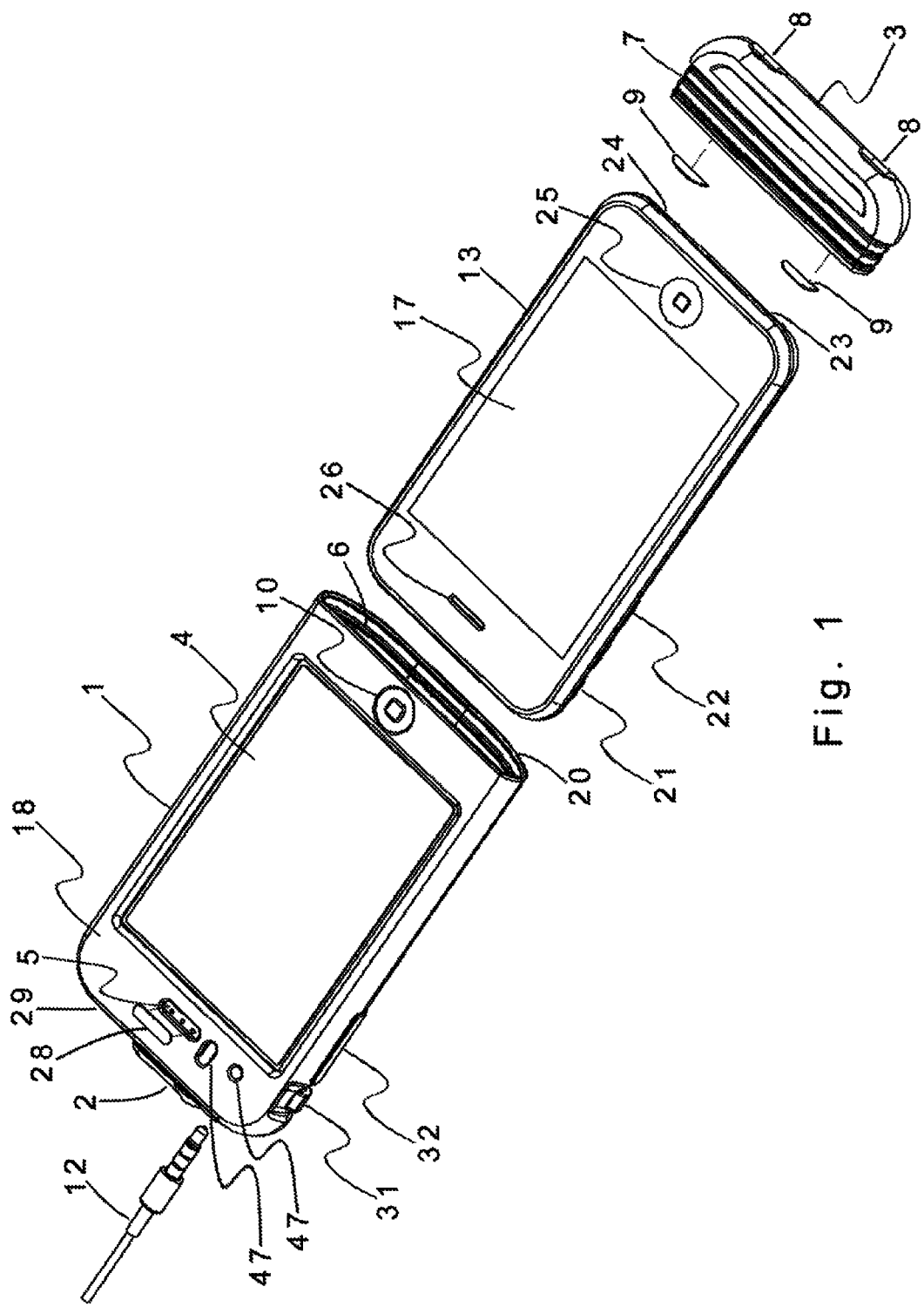
FIGS. 1 and 1*b* are perspective views from the front and back, respectively, of a cover for a personal digital device according to the present invention.

The preferred embodiment of an electronic device cover 1 is shown in FIGS. 1-4. The embodiment of the device cover 1 shown in the drawings corresponds to a specific electronic device 13, however it is understood that the actual positioning and availability of the features of the cover discussed below can be customized for any electronic device.

Cover 1 comprises a soft, elastomeric shell 18, having a front, back, sides, a closed end 29 and an open end 20 through which a device 13 can be inserted into the cover 1. The thickness of the shell is preferably 0.787 inches (2 mm) thick which provides some shock absorption but maintains the svelte profile of the cover. Cover 1 has a fully integrated protective membrane 4 positioned so as to correspond to the position of the screen 17 of the device 13 to be placed in the cover. Protective membrane 4 is adapted to allow viewing of the device screen 17, and use thereof in the case of touch screens. A water-resistant acoustic vent 28 covers the earphone speaker aperture 5. As shown in FIG. 1*b*, the cover 1 also has a protective membrane 11 positioned to correspond to the position of the camera lens (not shown) of the device 13 when the device is properly inserted into the cover 1.

The protective membranes 4, 11 are preferably made of a polycarbonate resin thermoplastic that is treated on both sides with a protective UV coating. Preferably during the making of the protective cover 1, the protective membrane is also coated with an applied PVC registration membrane 16 and a protective vinyl mask 53 as discussed in more detail below. An example of a suitable polycarbonate resin thermoplastic is that marketed under the trademark LEXAN® made by SABIC Innovative Plastics. It is also contemplated that other materials such as acrylic and polyethylene terephthalate Glycol (PETG) or a polyester sheet such as Mylar® could be used to form the protective membrane. The protective membranes are thermally bonded to the soft, elastomeric shell 18 of the cover 1 in an injection molding process described below.

As shown best in FIGS. 2*a*-2*d*, the closed top of the cover 1 has an aperture 14 for an audio jack positioned to correspond to the audio jack aperture of the device 13. Aperture 14 is preferably in the form of a single, o-ring profile which is molded into the cover to provide a water-resistant seal when an audio jack 12 is in use. The o-ring preferably has a diameter which is slightly smaller than the diameter of the plastic head 15 of the corresponding headphone audio jack so that when the headphone audio jack 12 is inserted into the aperture 14, it forms a very tight seal thereby preventing water ingress. A portion of the plastic head 15 fits within the o-ring 14, the soft, flexible elastomeric o-ring 14 deforming to allow the plastic head 15 to fit within it in a tight friction fit.

A rigid, plastic audio jack slider 2 in the top of the cover is slidable from an open position as shown in FIGS. 2*a* and 2*b* to a closed position as shown in FIG. 2*c*. FIG. 2*d* shows the audio jack slider 2 separated from the cover 1 in order to show the aperture 14 and corresponding elongated guide slot 19. Audio jack slider 2 closes the audio jack aperture 14 with a double, internal and external seal to maintain a water-resistant seal in the closed position.

The double seal is best illustrated in FIGS. 8 and 9a to 9d. Slider 2 is preferably comprised of an internal 35 and external 36 sealing elements joined by a central column 39. A protruding sealing element 37 sized to fit within aperture 14 and guide slot 19 projects downwards from the lower side of external sealing element 36. Preferably the protruding sealing element 37 has curved leading and trailing edges and has straight sides, the width of which corresponds to the width of the guide slot 19. When the slider 2 is positioned in the open position, protruding sealing element 37 is seated within the guide slot 19 forming a seal. When in the closed position, protruding sealing element 37 is seated in aperture 14, the leading edge of the sealing element pushing on the soft edge of the o-ring causing it to deform so as to conform to the shape of the sealing element 37 thereby forming a seal. When in the closed position, aperture 14 is therefore blocked on the outside of the cover by external sealing element 36 (and sealing element 37) and on the inside by internal sealing element 35.

Figure 8A:
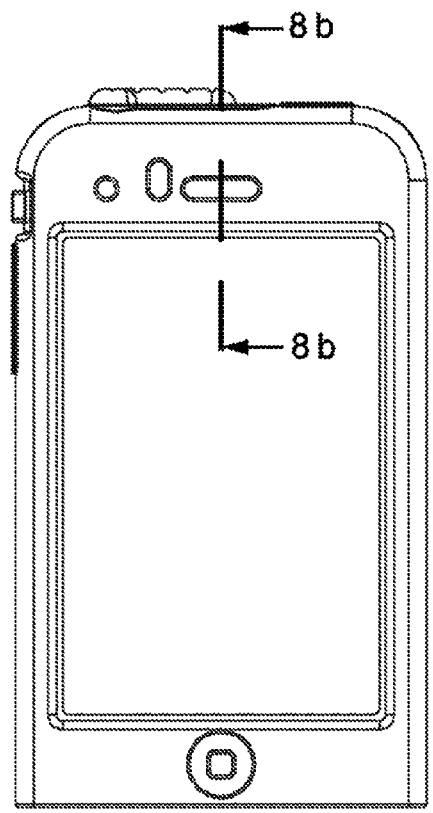
FIG. 8*a* is a front plan view of the cover with the plastic slider shown in the closed position as shown in FIG. 2*c*
Figure 8B:
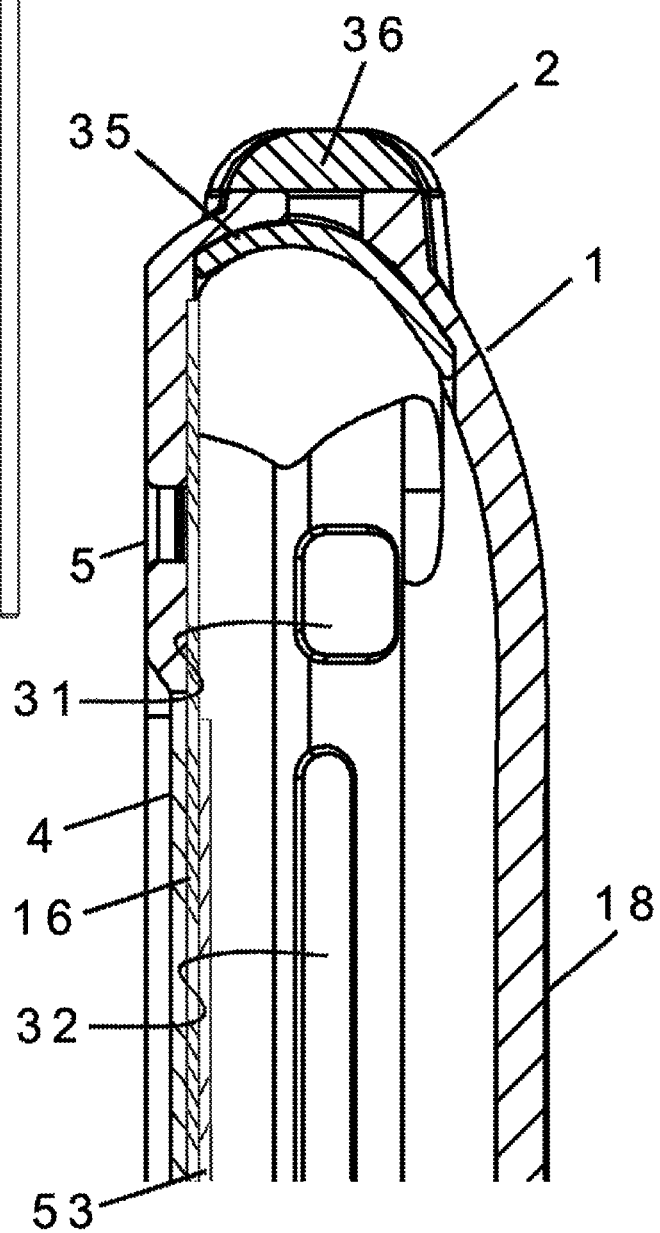
FIG. 8*b* is a cross-sectional view of a portion of the cover taken along the line 8-8 shown in FIG. 8*a*.
Figure 9B:
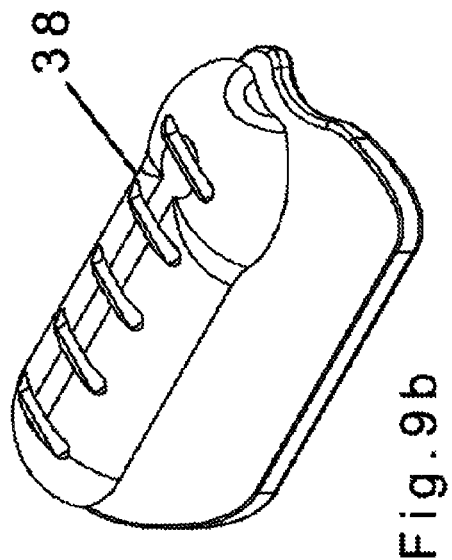
FIG. 9*b* is a front perspective view of the slider taken from the top left.
Figure 9D:
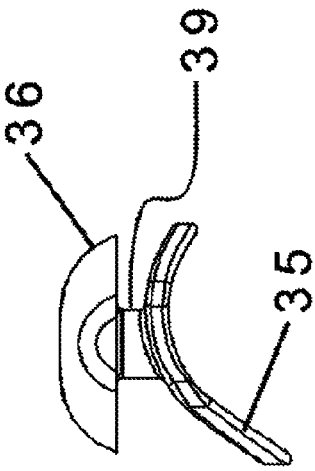
FIG. 9*d* is a front view of the slider.
Figure 9A:
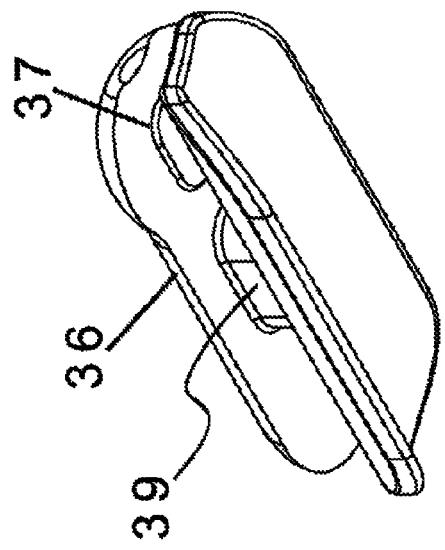
FIG. 9*a* is a front perspective view of the slider taken from the bottom left.
Figure 9C:
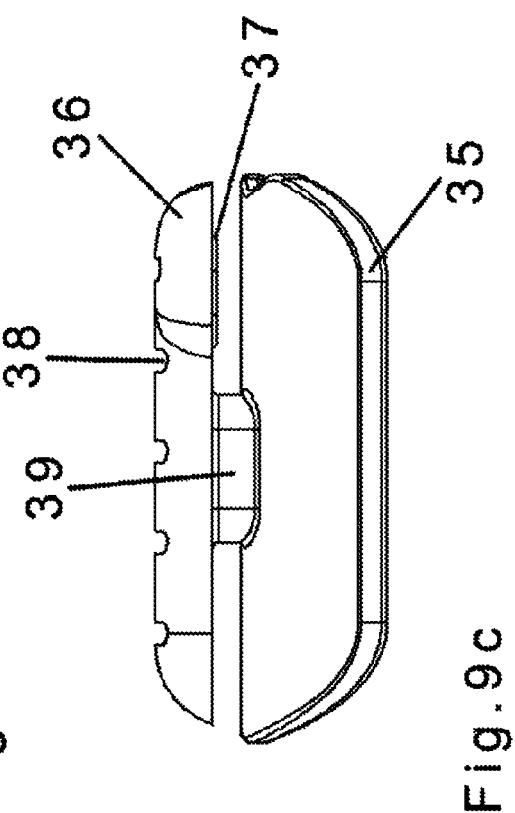
FIG. 9*c* is a left side view of the slider.

As shown in FIG. 8, the slider is shaped to correspond to the shape of the cover 1, such that external sealing element 36 is a planar element sitting on top of the cover and internal sealing element 35 is curved so as to form fit in contact with the device 13 when it is inserted into cover 1. The slider 2 is inserted into elongated guide slot 19, the soft elastomeric shell 18 derforming to allow the slider to be properly positioned within the slot 19. Column 39 limits the movement of the slider within the guide slot 19 such that it is movable only between open and closed positions. When slided into the closed position, the internal 35 and external 36 sealing elements are in contact with the outer surface and inner surfaces of the o-ring aperture 14. A series of laterally spaced indents 38 formed in the top surface of external seal 36 provide added grip for a user's thumb or finger when moving the slider between the open and closed positions.

Figure 1B:
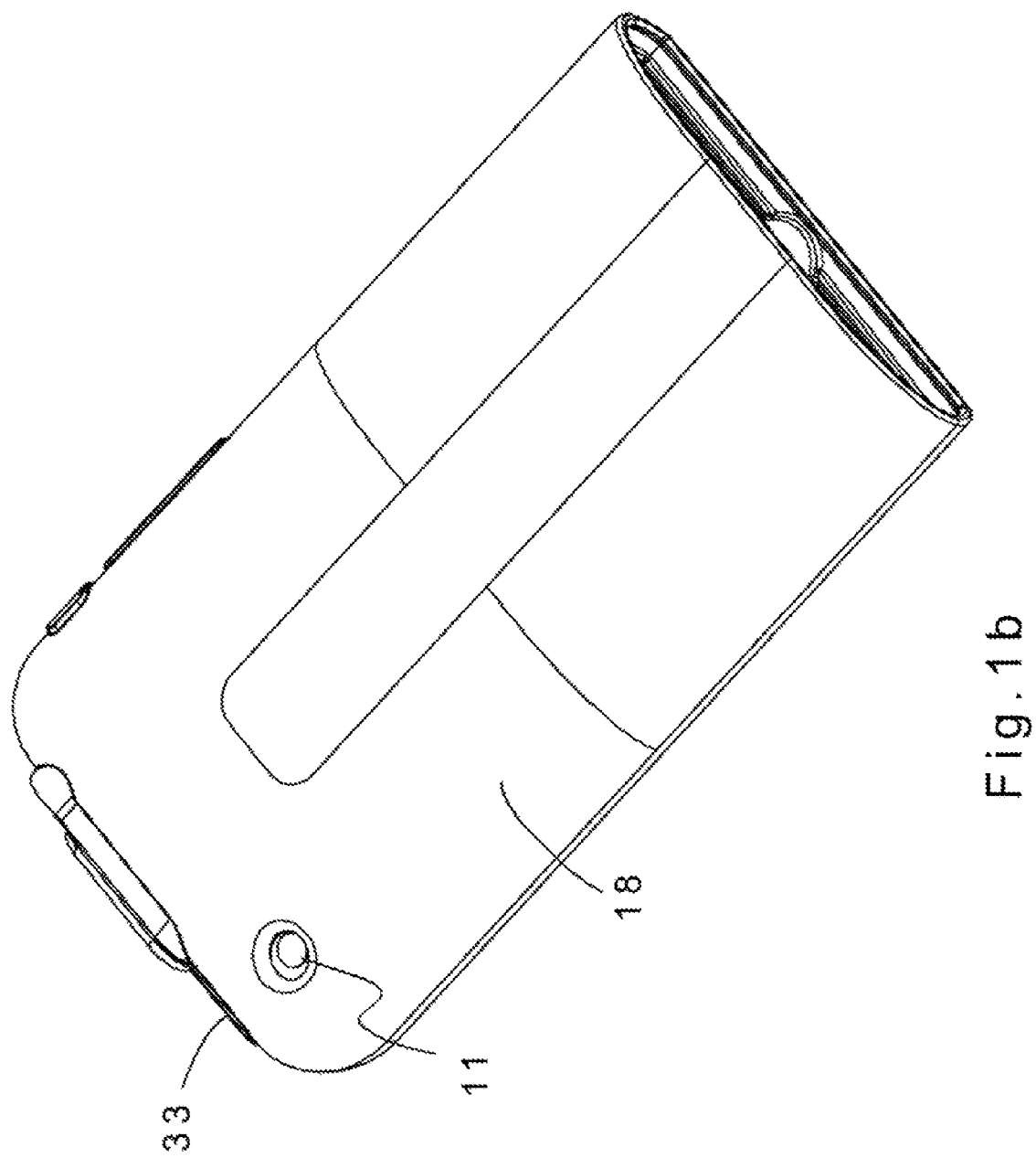

A plastic end cap 3, shown in FIGS. 1, 3a and 3b, is releasably connectable to the open end of shell 18 in order to fully enclose the device 13 after it has been inserted into shell 18. Plastic end cap 3 has a series of rigid male and female profiles 7. Cover 1 has a series of reciprocal, male and female profiles 6 that are molded into the interior of the soft, elastomeric shell 18 at the open end 20. When end cap 3 is connected to cover 1 by insertion into open end 20 the reciprocal male and female profiles 6 and 7 interconnect thereby forming a seal—the rigidity of the end cap profiles 7 support the flexible profiles 6 of the soft, elastomeric shell 18. Acoustic vents 9 and 28 (shown in FIG. 1), are applied in the form of a decal to speaker apertures 8 which are formed in the injection molded end cap 3 and over the earphone speaker aperture 5. The acoustic vents 9 and 28 allow sound to travel through the speaker apertures 8 and the earphone aperture 5, while preventing the ingress of water into the cover. The end cap 3 has a protrusion 55 in its interior that has a gradient that corresponds to the position and the indentation of the device's home button 25 of the device so as to allow proper functioning of the home button.

FIGS. 4a-c illustrate specific aspects of the invention which include: the mechanically integrated audio jack slider 2 in the top of the cover which closes the audio jack aperture 14 from both the inner and outer surfaces of the case; the structure of the reciprocal seal profile 6 molded into the interior of the soft, elastomeric shell 18 at the open end 20, the scope of the polycarbonate window 4 which is bonded to the inner surface of the cover and extends internally in the case to cover the aperture for the acoustic speaker 5 to provide a water-resistant seal without inhibiting sound quality; and the application of one layer of the PVC decal 16 on the exterior surface of the polycarbonate window 4 and of the protective vinyl mask 53 on the interior surface of the polycarbonate window 4.

Each of the three main components—shell 18, protective membranes 4, 11 and end cap 3 is form-fitted to the device for which it is designed, including the configurations of the device's peripheral buttons, apertures and screen. For example, device 13 shown in FIGS. 1a and 1b, has a ring/silent button 21, a volume control 22, a speaker 23, a microphone 24, a home button 25, a telephone speaker 26, a camera lens (not shown) and a power button (not shown). In order to allow proper functioning of these device features, the cover 1 has respective areas corresponding to the features, including elevated molded areas forming a ring/silent button 31, a volume control button 32, a power button 33 and, as shown in FIG. 4, a slightly indented area corresponding to the home button 10, which itself is indented on the device 13. The tolerance or thickness of the elastomeric shell around the peripheral controls is preferably reduced to a thickness of approximately 0.04 inches (1 mm) to allow greater ease in manipulating the controls. In addition, the cover has speaker apertures 8, telephone speaker 5 and camera lens protective membrane 11. The headphone aperture 14 and slider 2 have already been discussed in detail.

i. Equipment and Materials

The cover's windows 4, 11 are cut from a polycarbonate sheet on a die-cut machine to a predetermined size and shape corresponding to the part of the device to which they apply. Thin layers of polyvinyl chloride (PVC) 16 and a protective vinyl mask 53 are kiss-cut and applied to the polycarbonate windows as decals. The PVC decals are used to register the windows to an exact location of the window to the mold as discussed in more detail below. The PVC decals, preferably at a thickness of 0.03 inch thick each (0.762 mm), are pre-masked onto one side of the 0.01 inch (0.254 mm) polycarbonate window. Preferably, the protective vinyl mask is 1/64 inch (0.5 mm) thick and is applied to the polycarbonate window 4, on the opposite side as the PVC decals. It is also contemplated that an adhesive paper or cling film could be used in place of the vinyl mask.

The decals are preferably adhered to within 0.118 of an inch (3 mm) from the edge of the windows 4, 11 so as to allow the windows 4, 11 to be bonded to the elastomeric shell 18.

Figure 6A:
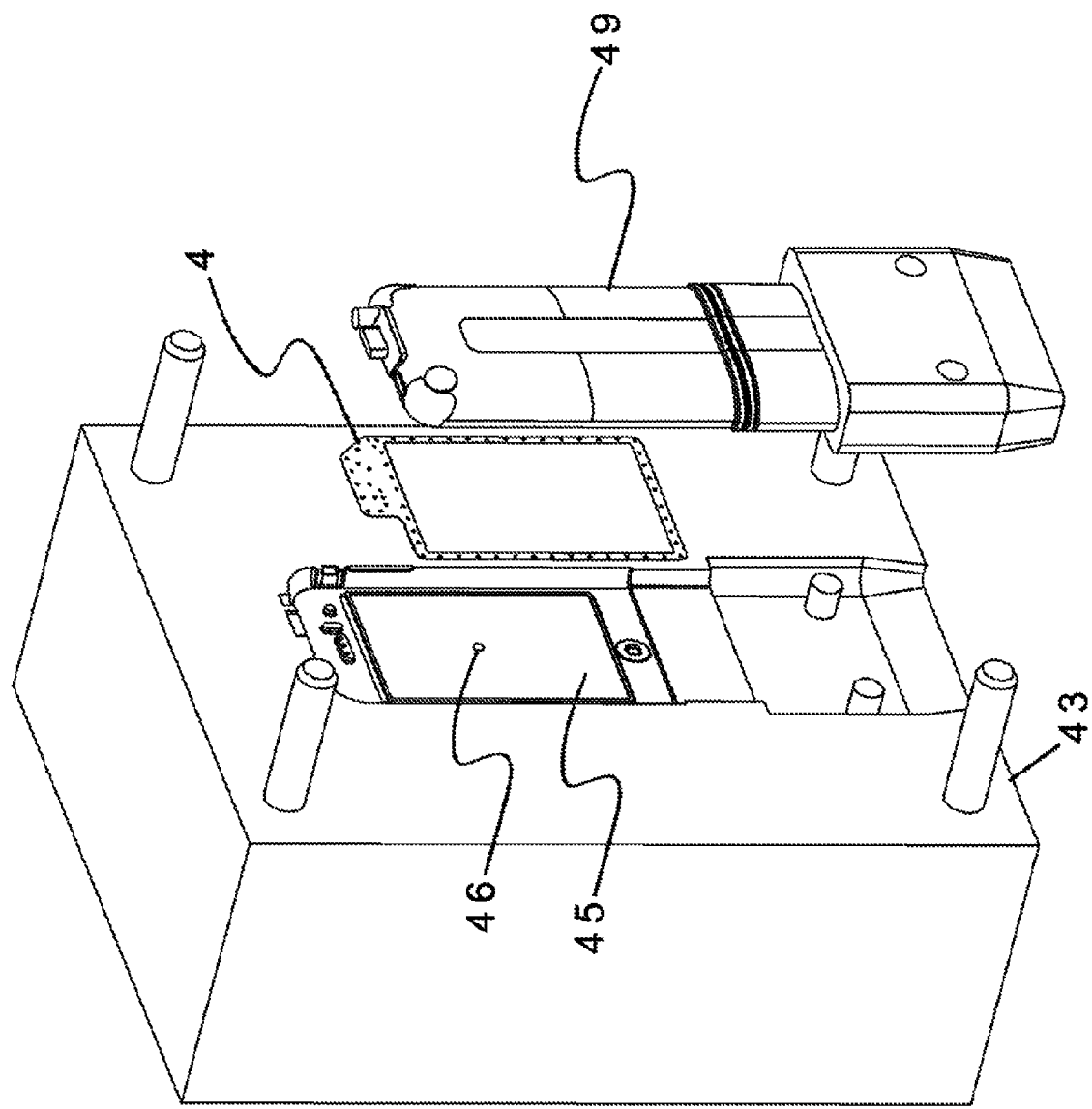

The shell 18 of the cover 1 is injection molded on a mandrel 49 in a mold formed of front and rear steel molds 43 and 44 shown in FIGS. 6a and 6b and is preferably manufactured from a thermoplastic elastomer (TPE). It is also contemplated that a thermoplastic rubber (TPR) may also be used. The audio jack slider 2 and the end cap 3 are both injection molded in steel molds and are manufactured from polycarbonate Lexan 141-701. It is also contemplated that other suitable materials could be used, such as acrylonitrile butadiene styrene (ABS).

The water-resistant acoustic vent material 9 included in the end cap 3 covers the apertures 8 for the speaker 23 and microphone 24 from the inside of the end cap 3. Preferably, acoustic vent material 9 is a microporous hydrophobic membrane such as that manufactured by W. L. Gore & Associates, Inc. The membrane is die-cut and a water-resistant adhesive is applied annularly for adhesion of the acoustic vent material 9 to the apertures 8.

An ejector shown in FIGS. 7a, 7b and 7c is used to remove the newly formed cover 1 from the mandrel 49. The ejector comprises an ultra high molecular weight (UHMW) polyethylene stripper die 50, a pneumatic cylinder 51 and a base plate 52. The pneumatic cylinder 51 is mounted on base plate 52, which is preferably made of machined aluminum having two alignment pins (not shown) upon which the steel mandrel 49 can be mounted to hold it in place while the cover 1 is being removed. Stripper die 50 is preferably in the form of a machined block having a contact face 54 corresponding to the screen area for window 4 of the cover. The stripper die 50 is connected to the pneumatic cylinder 51 and is actionable in a reciprocating linear motion by the cylinder 51 in order to effect the de-molding of the cover 1 from the mandrel 49. It is also contemplated that the cylinder 51 could be hydraulic or otherwise formed to be able to provide reciprocal linear motion.

ii. Process Steps

The molding process of the present invention described herein will be illustrated by a cover for a branded cellular telephone that features a touch-screen and an internal camera; although it will be understood that the process steps are equally applicable to the manufacture of other covers having configurations which suit the personal digital devices of various brands.

Figure 5:
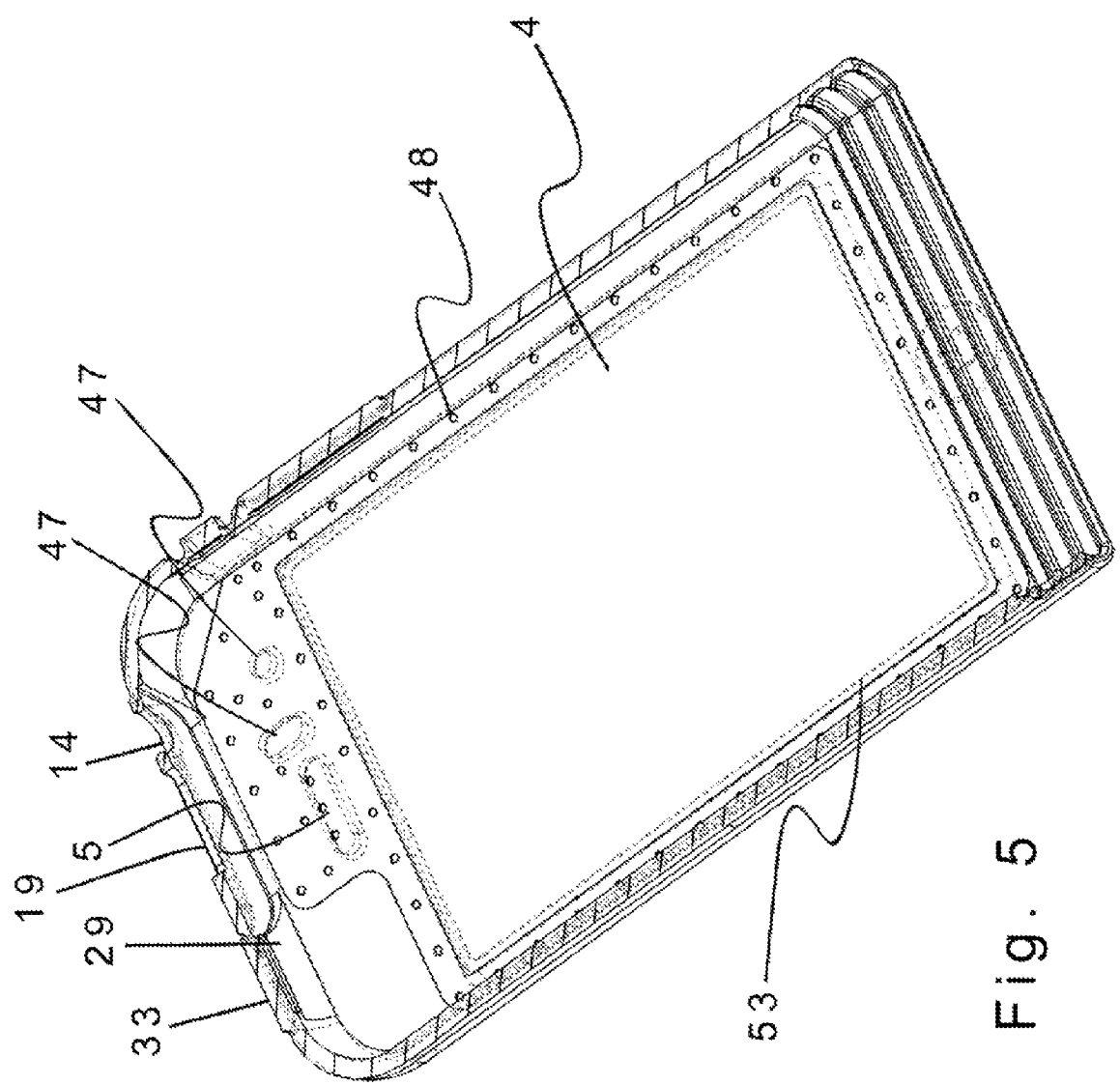
FIG. 5 is a sectional view of the cover showing the front interior and that illustrates the design and placement of the polycarbonate window.

The TPE is thermally bonded to the polycarbonate windows 4, 11 during the injection molding process. FIG. 5 illustrates how a further mechanical adhesion is included, whereby the edges of the polycarbonate window 4 are perforated with small, preferably 0.06 inch (1.5 mm), holes 48 in the die-cutting phase to allow the TPE to flow though the polycarbonate membrane to create an even stronger bond between the cover's shell and window. The combination of thermal and mechanical bonding of the polycarbonate membrane 4 to the shell 18 ensures that no delamination will occur. The polycarbonate window 4 also extends to cover two openings for sensors 47 so as to allow the phone's screen to go into power saving mode when held to the ear. The protective vinyl mask 53 protects the polycarbonate window from scratching during the molding process.

FIGS. 6a and 6b illustrate the placement of the layered polycarbonate window 4, having the applied PVC decal 16 into the registration cavity 45 of the mold 43 where they are registered prior to the injection cycle. To assure the consistent placement and alignment of the windows onto the mandrel 49 of the mold, the windows are secured in place throughout the injection molding cycle by the outer edge of the PVC decal 16 which is sized to fit within the confines of the registration cavity 45 defined by perimeter wall 42. Once properly aligned within the registration cavity 45, the window 4 is held in place by way of vacuum pressure inside the registration cavity 45 which is created by a vacuum port 46 that is machined through the surface of cavity 45 into the core of the mold 43. While it is not shown in the drawings, there is also a corresponding vacuum port and registration cavity in mold 44 for registering the camera lens protective membrane 11. It is understood that a similar process is followed for protective membrane 11.

Preferably, as shown in FIG. 6b, two placement pins 41 are machined into the mandrel 49 so as to further align the window prior to the mold closing for the molding process. Preferably, the cavity of the mold 45 and the mandrel 49 are coated with a non-stick coating such as that sold under the trademark Nibore®. It is also contemplated that other similar products having non-stick characteristics such as that sold under the Trademark Teflon® may be used.

FIGS. 7a, 7b and 7c illustrate the removal of the cover from the mandrel 49 upon the completion of the injection cycle. The front and rear molds 43, 44 are separated from one another and the mandrel 49 of the mold, with the integrated shell 18 and windows 4, 11 intact, is removed from the mold and placed in the ejector. The mandrel 49 is placed on the alignment pins on the plate 52 and the stripper die is positioned so that contact face 54 is fitted in contact with the window 4 (coated with the PVC decal 16) within the boundary defining the window within the elastomeric shell 18. Stripper die 50 pneumatically removes the cover 1 from the mandrel 49 of the mold using shear force that is generated by the cylinder 51. The stripper die 50 allows the cover 1 to be easily removed from the mandrel 49 so as not to compromise the tolerance of the profile of the soft TPE cover.

As discussed above, acoustic vents 9 and 28, manufactured from a water-resistant membrane, are applied in the form of an adhesive decal to the speaker apertures 8 on the inner side of the injection molded end cap 3 and the earphone aperture 5 in the shell 18 of the cover.

The injection molded audio jack slider 2 and end cap 3 are manually attached to the shell to complete the assembly of the water-resistant cover. The PVC decals 16 and the protective vinyl mask 53 are removed following assembly.

It will be appreciated by those skilled in the art that the preferred and alternative embodiments have been described in some detail but that certain modifications may be practiced without departing from the principles of the invention.

What is claimed is:

1. A protective cover for an electronic device having a viewing screen, said cover comprising:
    a shell defining an enclosure with an opening at one end and having a shape corresponding to the shape of said electronic device, said opening for receiving said electronic device within said enclosure, said shell being formed of a soft, elastomeric material;
    a protective membrane integrally connected to said shell, providing a viewing window through which said viewing screen may be viewed when said electronic device is inserted into said shell; and
    a rigid end cap removably connectable to said open end of said shell to fully encase said electronic device when inserted into said shell.

2. The protective cover of claim 1 wherein said protective membrane is thermally and mechanically bonded to said shell.

3. The protective cover of claim 2 wherein said protective membrane having a plurality of perforations.

4. The protective cover of claim 3 wherein said shell being made of a thermoplastic elastomer or a thermoplastic rubber.

5. The protective cover of claim 4 wherein said thermoplastic elastomer or thermoplastic rubber passes through said plurality of perforations to form said mechanical bond between said shell and said protective membrane.

6. The protective cover of claim 5 wherein said protective membrane is a polycarbonate resin thermoplastic.

7. The protective cover of claim 1 further comprising an aperture in said shell corresponding to an input area of said electronic device and an elongated guide slot in said shell adjacent to said aperture, said aperture being sealable by way of a rigid slider slidable within said guide slot from an open position wherein said aperture is open, to a closed position wherein said aperture is sealed.

8. The protective cover of claim 7 wherein said slider closes said aperture with a double internal and external seal to maintain a water-resistant seal about the aperture when in the closed position.

9. The protective cover of claim 8 wherein said slider having an internal sealing element and an external sealing element joined by a central column.

10. The protective cover of claim 9 wherein said slider further comprises a protrusion extending from said external sealing element, said protrusion inserting into said aperture when said slider is in the closed position.

11. A method of manufacturing a protective cover for an electronic device having a viewing screen comprising the steps of:
   thermally and mechanically bonding a polycarbonate window to a soft outer shell.

12. A method of manufacturing a protective cover for an electronic device having a viewing screen comprising the steps of:
   preparing a mold having a first portion and a second portion, said mold having a shape corresponding substantially to, and slightly larger than, the shape of said electronic device;
   positioning a protective membrane into said first portion, said protective membrane having a plurality of perforations about its outer edge;
   positioning a mandrel into said first portion adjacent said protective membrane, said mandrel shaped to correspond to the shape of said electronic device;
   connecting said second portion to said first portion thereby enclosing said protective membrane and mandrel within said mold;
   injecting an elastomeric material into said mold, said elastomeric material surrounding said mandrel and thermally and mechanically bonding to said protective membrane.

13. The method of claim 12 further comprising the step of:
   prior to positioning of said protective membrane into said first portion, affixing a removable decal to a first side of said protective membrane, said removable decal shaped and sized to fit within a registration cavity defined in said first portion of said mold to ensure proper positioning of said protective membrane.

14. The method of claim 13 further comprising the step of:
   applying a vacuum pressure inside said registration cavity to hold said protective membrane in place during the injection molding.

15. The method of claim 14 wherein said mandrel having placement pins to further aid in the proper alignment of said protective membrane.

16. The method of claim 15 wherein said mold and said mandrel having a non-stick coating.

17. The method of claim 13 wherein prior to positioning of said protective membrane into said first portion, applying a removable protective mask to a second side of said protective membrane opposite said first side.

18. The method of claim 12 further comprising the step of removing said mandrel from said mold, said mandrel surrounded by said protective cover and removing said cover from said mandrel.

19. The method of claim 18 further comprising the step of connecting an acoustic vent to a corresponding aperture in said cover, said aperture positioned to correspond to an audio related element of said electronic device.

20. The method of claim 19 further comprising molding a rigid end cap for connecting with an open end of said cover.

* * * * *